United States Patent
Sun et al.

(10) Patent No.: US 10,551,135 B2
(45) Date of Patent: Feb. 4, 2020

(54) OIL SEPARATOR

(71) Applicant: Heatcraft Refrigeration Products LLC, Stone Mountain, GA (US)

(72) Inventors: Xi Sun, Snellville, GA (US); Shitong Zha, Snellville, GA (US)

(73) Assignee: Heatcraft Refrigeration Products, LLC, Stone Mountain, GA (US)

( * ) Notice: Subject to any disclaimer, the term of this patent is extended or adjusted under 35 U.S.C. 154(b) by 0 days.

(21) Appl. No.: 15/892,943

(22) Filed: Feb. 9, 2018

(65) Prior Publication Data

US 2018/0259274 A1    Sep. 13, 2018

Related U.S. Application Data

(63) Continuation of application No. 15/654,447, filed on Jul. 19, 2017.

(Continued)

(51) Int. Cl.
  *F28F 27/02*  (2006.01)
  *F25B 1/10*  (2006.01)
  (Continued)

(52) U.S. Cl.
  CPC ............ *F28F 27/02* (2013.01); *F25B 1/10* (2013.01); *F25B 43/02* (2013.01); *F25B 49/022* (2013.01);
  (Continued)

(58) Field of Classification Search
  CPC  F28F 27/02; F25B 43/00; F25B 43/02; F25B 2400/02; F25B 2400/23; F25D 23/068; F25D 2021/0068

(Continued)

(56) References Cited

U.S. PATENT DOCUMENTS 4,539,023 A    9/1985   Boley
6,185,955 B1 *  2/2001   Yamamoto ............. C09K 5/041
                                        62/470

(Continued)

FOREIGN PATENT DOCUMENTS

CN    201840936 U  *  5/2011
CN    103388942 A  *  11/2013

(Continued)

OTHER PUBLICATIONS

Weijun Lin, Oil-Gas Separator, May 2011, English Translation, European Patent Office (CN 201840936 U).*

(Continued)

*Primary Examiner* — Frantz F Jules
*Assistant Examiner* — Steve S Tanenbaum
(74) *Attorney, Agent, or Firm* — Baker Botts L.L.P.

(57) ABSTRACT

According to one embodiment, a system includes a high side heat exchanger, a load, a compressor, and a horizontal oil separator. The high side heat exchanger is configured to remove heat from a refrigerant. The horizontal oil separator comprises a centrifugal chamber, an oil, a cut line, a filter, a collector, and an outlet. The centrifugal chamber is configured to receive the refrigerant from the compressor and rotate the refrigerant, wherein rotating the refrigerant separates an oil from the refrigerant. The cut line is configured to prevent the oil separated in the centrifugal chamber from combining with the refrigerant. The filter is configured to separate additional oil from the refrigerant. The collector is configured to collect the oil separated in the centrifugal chamber and the additional oil. The outlet is configured to discharge the refrigerant to the high side heat exchanger.

6 Claims, 3 Drawing Sheets

Related U.S. Application Data

(60) Provisional application No. 62/468,062, filed on Mar. 7, 2017.

(51) Int. Cl.
| | |
|---|---|
| *F25B 43/02* | (2006.01) |
| *F25B 49/02* | (2006.01) |
| *F25D 23/06* | (2006.01) |
| *F28D 21/00* | (2006.01) |
| *G05D 23/12* | (2006.01) |
| *B01D 45/12* | (2006.01) |
| *B01D 50/00* | (2006.01) |

(52) U.S. Cl.
CPC .... *F25D 23/068* (2013.01); *F28D 2021/0068* (2013.01); *G05D 23/122* (2013.01)

(58) Field of Classification Search
USPC .......................................................... 62/470
See application file for complete search history.

(56) References Cited

U.S. PATENT DOCUMENTS

| | | | | |
|---|---|---|---|---|
| 2003/0014951 | A1* | 1/2003 | Crouse ................... | B01D 45/06 55/322 |
| 2004/0065110 | A1* | 4/2004 | Barratt ................... | B01D 45/06 62/471 |
| 2006/0123833 | A1* | 6/2006 | Flanigan ................. | F25B 43/02 62/470 |
| 2013/0255308 | A1* | 10/2013 | De Larminat .......... | F25B 43/02 62/470 |
| 2015/0135961 | A1* | 5/2015 | Sugio ..................... | F01N 3/037 96/381 |
| 2015/0345835 | A1* | 12/2015 | Martin .................... | F25B 7/00 62/238.3 |

FOREIGN PATENT DOCUMENTS

| | | | |
|---|---|---|---|
| CN | 106122027 | | 11/2016 |
| JP | H08159581 | * | 6/1996 |
| JP | 2014044006 | | 3/2014 |

OTHER PUBLICATIONS

Chen Hua et al., Horizontal type oil separator, Nov. 13, 2013, European Patent Office, English Translation (Year: 2013).*

Communication from EPO Patent Office, Application No. 18160510.6-1008; Ref: JL93539P.EPP, dated Jun. 7, 2018.

New Bitzer OAHC 3-Stage Combined Oil Separators; YouTube; retrieved from the Internet: URL:https://www.youtube.com/watch?v=QQm4bUL7918; retrieved on May 25, 2018, Oct. 4, 2016.

European Patent Office, Communication pursuant to Article 94(3) EPC, Application No. 18160510.6, dated May 2, 2019, 6 pages.

* cited by examiner

OIL SEPARATOR

PRIORITY

This application is a continuation under 35 U.S.C. § 120, of U.S. patent application Ser. No. 15/654,447 filed Jul. 19, 2017 and entitled "Oil Separator," and claims the benefit under 35 U.S.C. § 119(a) of U.S. Provisional Application Ser. No. 62/468,062, filed Mar. 7, 2017, and entitled "Oil Separator for a Carbon Dioxide (CO2) Transcritical Refrigeration System", both of which are incorporated herein by reference.

TECHNICAL FIELD

This disclosure relates generally to a cooling system.

BACKGROUND

Cooling systems cycle a refrigerant to cool various spaces. For example, a refrigeration system may cycle refrigerant to cool spaces near or around a refrigeration unit. As another example, an air conditioning system may cycle refrigerant to cool a room.

SUMMARY OF THE DISCLOSURE

According to one embodiment, a system includes a high side heat exchanger, a load, a compressor, and a horizontal oil separator. The high side heat exchanger is configured to remove heat from a refrigerant. The load is configured to use the refrigerant to remove heat from a first space proximate to the load. The compressor is configured to compress the refrigerant from the first load. The horizontal oil separator comprises a centrifugal chamber, an oil, a cut line, a filter, a collector, and an outlet. The centrifugal chamber is configured to receive the refrigerant from the compressor. The centrifugal chamber is further configured to rotate the refrigerant, wherein rotating the refrigerant separates an oil from the refrigerant. The cut line is configured to prevent the oil separated in the centrifugal chamber from combining with the refrigerant. The filter is configured to separate additional oil from the refrigerant. The collector is configured to collect the oil separated in the centrifugal chamber and the additional oil. The outlet is configured to discharge the refrigerant to the high side heat exchanger.

According to another embodiment, a method includes removing heat from a refrigerant using a high side heat exchanger. The method also includes removing heat from a first space proximate to a load using the refrigerant. The method further includes compressing the refrigerant from the first load using a compressor. The method also includes receiving the refrigerant from a compressor using a centrifugal chamber. The method further includes rotating the refrigerant using the centrifugal chamber, wherein rotating the refrigerant separates an oil from the refrigerant. The method also includes preventing the oil separated in the centrifugal chamber from combining with the refrigerant using a cut line. The method further includes separating additional oil from the refrigerant using a filter. The method also includes collecting the oil separated in the centrifugal chamber and the additional oil using a collector. The method further includes discharging the refrigerant to the high side heat exchanger using an outlet.

According to yet another embodiment, a horizontal oil separator includes a centrifugal chamber, a cut line, a filter, a collector, and an outlet. The centrifugal chamber is configured to receive the refrigerant from the compressor. The centrifugal chamber is further configured to rotate the refrigerant, wherein rotating the refrigerant separates an oil from the refrigerant. The cut line is configured to prevent the oil separated in the centrifugal chamber from combining with the refrigerant. The filter is configured to separate additional oil from the refrigerant. The collector is configured to collect the oil separated in the centrifugal chamber and the additional oil. The outlet is configured to discharge the refrigerant to the high side heat exchanger.

Certain embodiments may provide one or more technical advantages. For example, an embodiment includes a horizontal oil separator with a centrifugal chamber. The centrifugal feature eliminates the need to manually change a core oil filter in conventional oil separators. As a result, the horizontal oil separator may be smaller, require lower maintenance, and increase the overall efficiency of the cooling system. Certain embodiments may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present disclosure, reference is now made to the following description, taken in conjunction with the accompanying drawings, in which.

DETAILED DESCRIPTION

Figure 1:
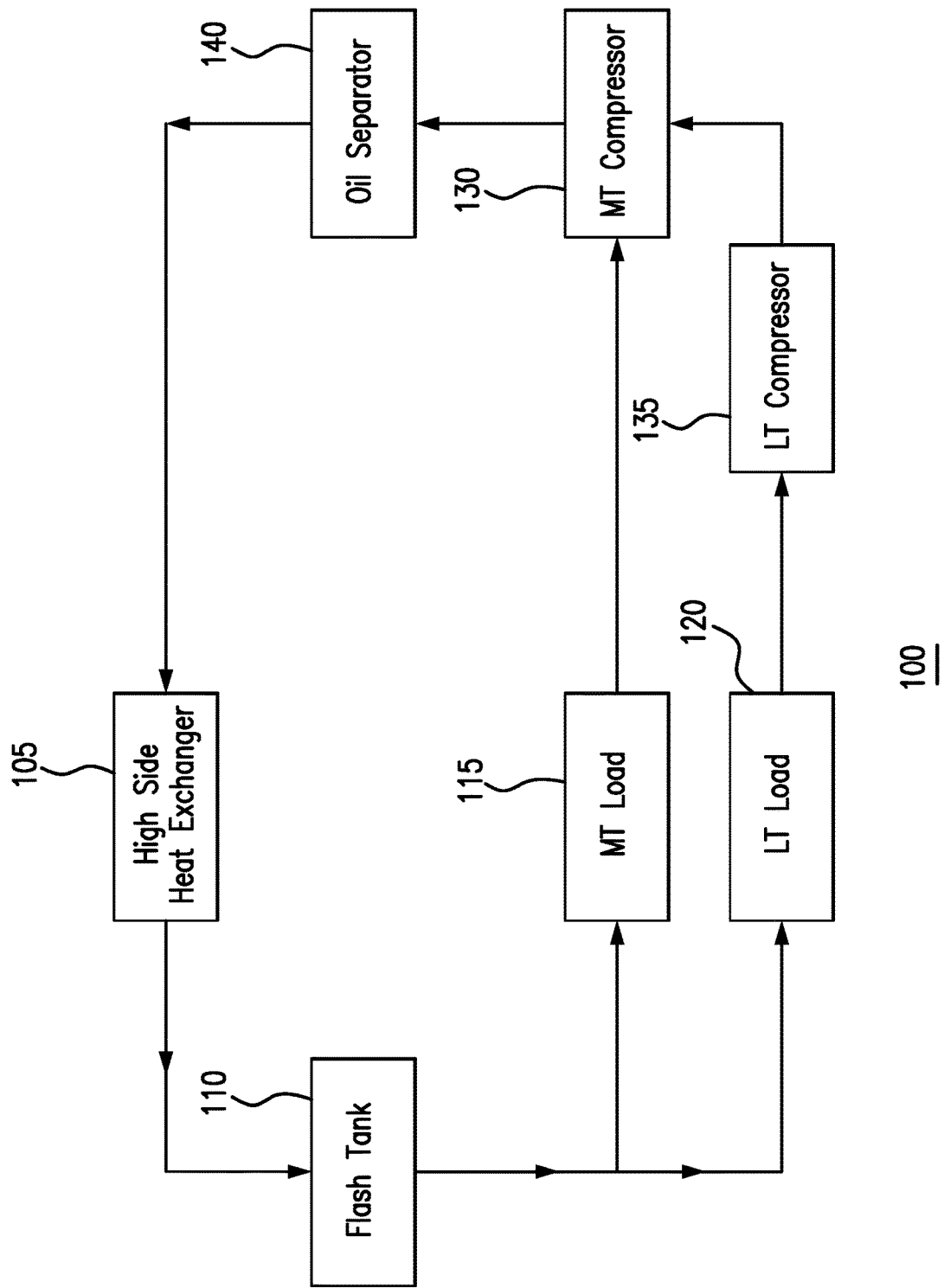
FIG. 1 illustrates an example cooling system with an oil separator, according to certain embodiments.
Figure 2:
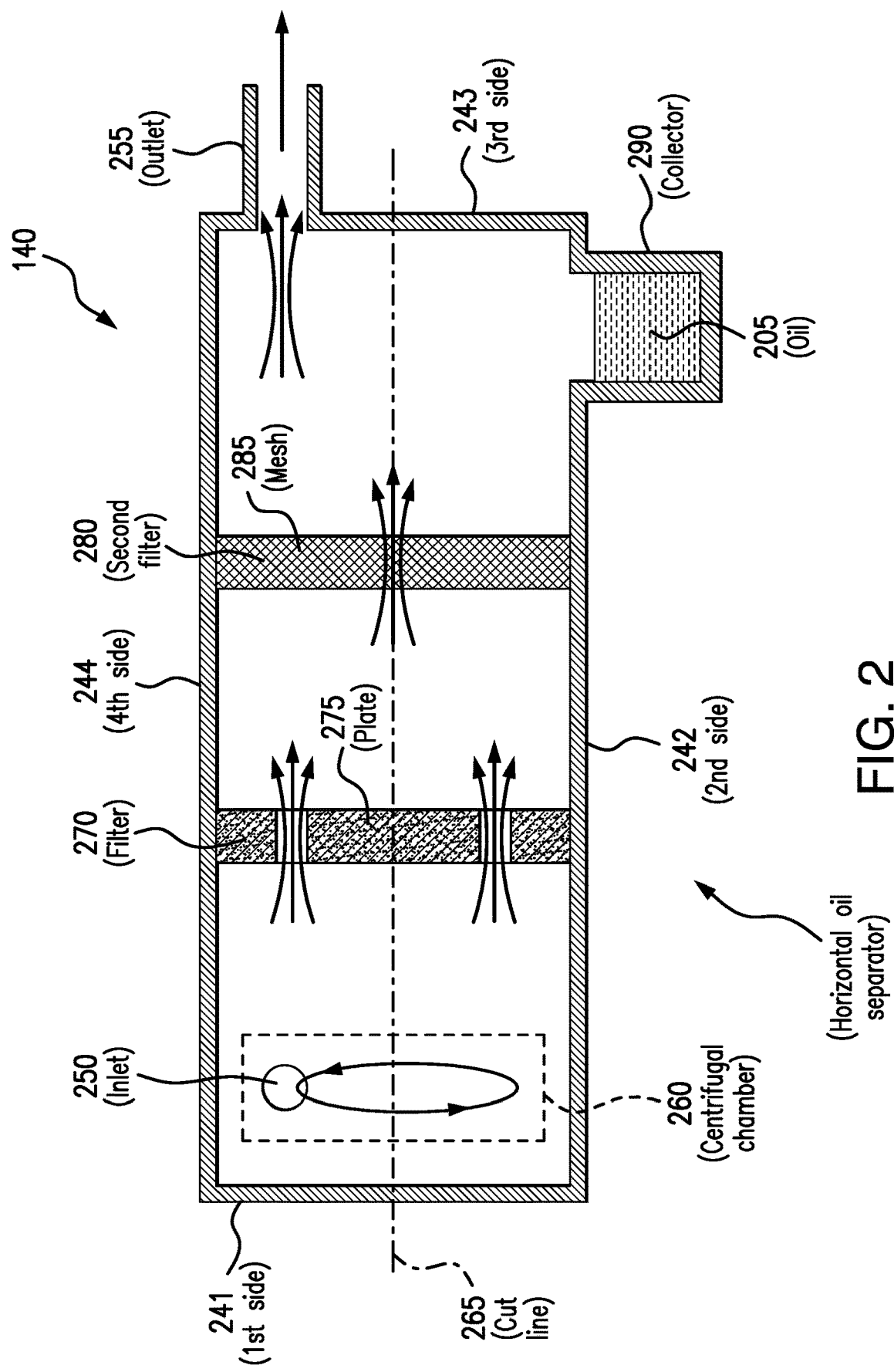
FIG. 2 illustrates an example of the horizontal oil separator, according to certain embodiments.
Figure 3:
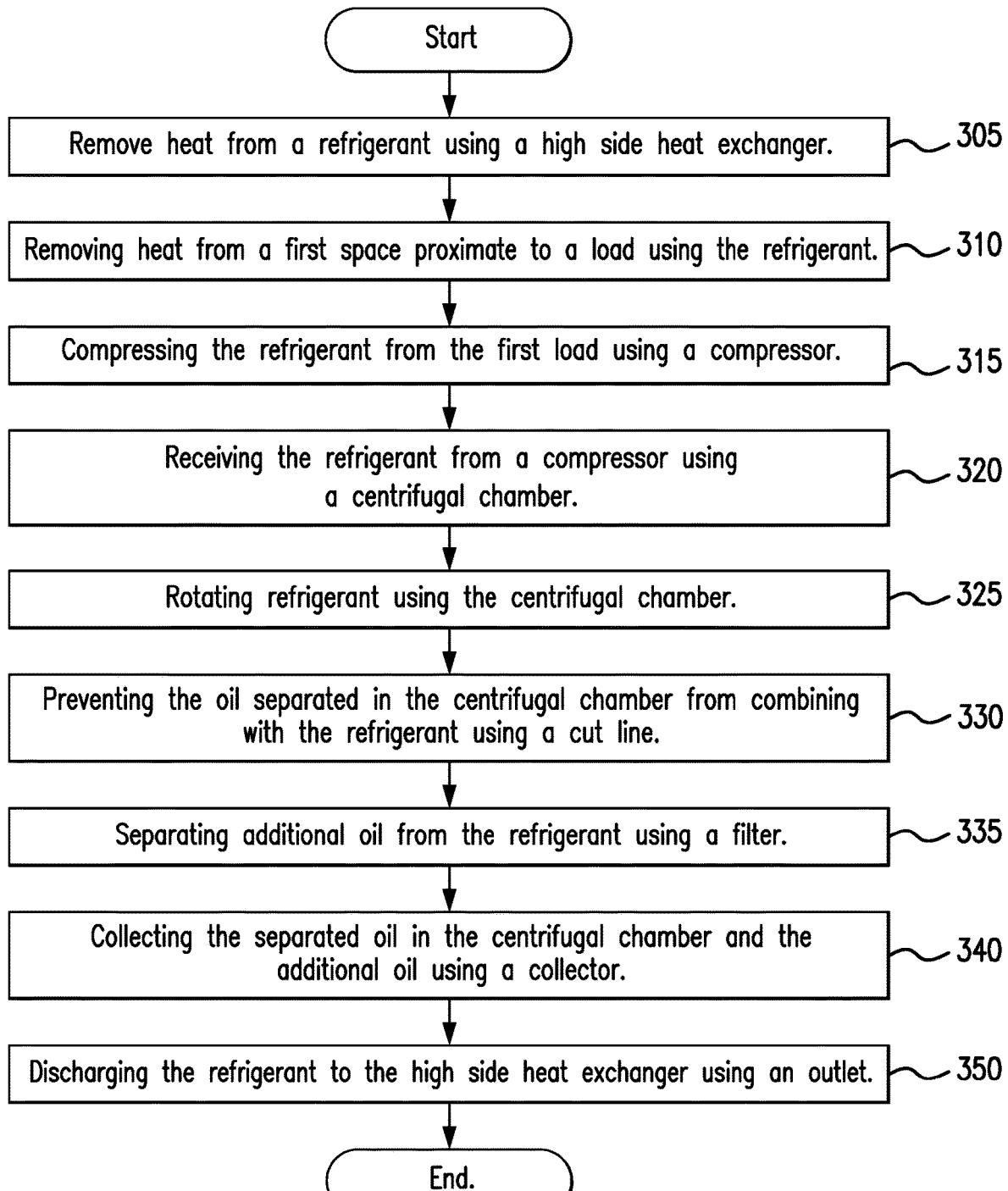
FIG. 3 is a flowchart illustrating a method of operating the example cooling system of FIG. 1.

Embodiments of the present disclosure and its advantages are best understood by referring to FIGS. 1 through 3 of the drawings, like numerals being used for like and corresponding parts of the various drawings.

Cooling systems may cycle a refrigerant to cool various spaces. For example, a refrigeration system may cycle refrigerant to cool spaces near or around refrigeration loads. In certain installations, such as at a grocery store for example, a refrigeration system may include different types of loads. For example, a grocery store may use medium temperature loads and low temperature loads. The medium temperature loads may be used for produce and the low temperature loads may be used for frozen foods. The compressors for these loads may be chained together. For example, the discharge of the low temperature compressor for the low temperature load may be fed into the medium temperature compressor that also compresses the refrigerant from the medium temperature loads. The discharge of the medium temperature compressor is then fed to a high side heat exchanger that removes heat from the compressed refrigerant.

The present disclosure contemplates a cooling system with a horizontal oil separator including a centrifugal feature. In conventional cooling systems, an oil separator removes oil from the refrigerant. Oil from compressors of the cooling system may mix with refrigerant passing through the compressors. As a result, the compressors may lose oil, which may cause the compressors to degrade. Oil mixing with the refrigerant may also result in oil entering the high side heat exchanger. Oil entering the high side heat exchanger may cause the high side heat exchanger to remove heat less efficiently from the refrigerant. Thus, the oil separator removing oil from the refrigerant prevents decreases in the overall efficiency of the cooling system. Conventional oil separators include a vertical coalescent oil separator. Conventional oil separators face many disadvantages such as the need to change the core oil filter periodically. Changing the core oil filter requires turning off the cooling system. The need to change the core oil filter manually also requires a larger oil separator with sufficient space to manually maneuver changing the oil filter.

The present disclosure contemplates a horizontal oil separator with a centrifugal feature to separate oil from the refrigerant. The centrifugal chamber eliminates the need to manually change a core oil filter. As a result, the need to open the oil separator to change the filter is eliminated, and the oil separator may be completely sealed. This in return allows for a smaller oil separator that requires lower maintenance, and increases the overall efficiency of the cooling system by reducing the instances where the cooling system is shut down.

The system will be described in more detail using FIGS. 1 through 3. FIG. 1 will describe an existing refrigeration system with an oil separator. FIGS. 2 and 3 will describe the refrigeration system with a horizontal oil separator.

FIG. 1 illustrates an example cooling system 100 with an oil separator 140. As shown in FIG. 1, system 100 includes a high side heat exchanger 105, a flash tank 110, a medium temperature load 115, a low temperature load 120, a medium temperature compressor 130, a low temperature compressor 135, and an oil separator 140.

High side heat exchanger 105 may remove heat from a refrigerant. When heat is removed from the refrigerant, the refrigerant is cooled. This disclosure contemplates high side heat exchanger 105 being operated as a condenser, a fluid cooler, and/or a gas cooler. When operating as a condenser, high side heat exchanger 105 cools the refrigerant such that the state of the refrigerant changes from a gas to a liquid. When operating as a fluid cooler, high side heat exchanger 105 cools liquid refrigerant and the refrigerant remains a liquid. When operating as a gas cooler, high side heat exchanger 105 cools gaseous refrigerant and the refrigerant remains a gas. In certain configurations, high side heat exchanger 105 is positioned such that heat removed from the refrigerant may be discharged into the air. For example, high side heat exchanger 105 may be positioned on a rooftop so that heat removed from the refrigerant may be discharged into the air. As another example, high side heat exchanger 105 may be positioned external to a building and/or on the side of a building.

Flash tank 110 may store refrigerant received from high side heat exchanger 105. This disclosure contemplates flash tank 110 storing refrigerant in any state such as, for example, a liquid state and/or a gaseous state. Refrigerant leaving flash tank 110 is fed to low temperature load 120 and medium temperature load 115. In some embodiments, a flash gas and/or a gaseous refrigerant is released from flash tank 110. By releasing flash gas, the pressure within flash tank 110 may be reduced.

System 100 may include a low temperature portion and a medium temperature portion. The low temperature portion may operate at a lower temperature than the medium temperature portion. In some refrigeration systems, the low temperature portion may be a freezer system and the medium temperature system may be a regular refrigeration system. In a grocery store setting, the low temperature portion may include freezers used to hold frozen foods, and the medium temperature portion may include refrigerated shelves used to hold produce. Refrigerant may flow from flash tank 110 to both the low temperature and medium temperature portions of the refrigeration system. For example, the refrigerant may flow to low temperature load 120 and medium temperature load 115. When the refrigerant reaches low temperature load 120 or medium temperature load 115, the refrigerant removes heat from the air around low temperature load 120 or medium temperature load 115. As a result, the air is cooled. The cooled air may then be circulated such as, for example, by a fan to cool a space such as, for example, a freezer and/or a refrigerated shelf. As refrigerant passes through low temperature load 120 and medium temperature load 115, the refrigerant may change from a liquid state to a gaseous state as it absorbs heat.

Refrigerant may flow from low temperature load 120 and medium temperature load 115 to compressors 130 and 135. This disclosure contemplates system 100 including any number of low temperature compressors 135 and medium temperature compressors 130. The low temperature compressor 135 and medium temperature compressor 130 may increase the pressure of the refrigerant. As a result, the heat in the refrigerant may become concentrated and the refrigerant may become a high pressure gas. Low temperature compressor 135 may compress refrigerant from low temperature load 120 and send the compressed refrigerant to medium temperature compressor 130. Medium temperature compressor 130 may compress refrigerant from low temperature compressor 135 and medium temperature load 115. Medium temperature compressor 130 may then send the compressed refrigerant to oil separator 140.

Medium temperature compressor 130 and low temperature compressor 135 may contain oil. The oil may mix with refrigerant passing through medium temperature compressor 130 and/or low temperature compressor 135, and exit the compressors. Loss of oil may cause low temperature compressor 130 and medium temperature compressor 135 to degrade. Oil in the refrigerant passing through system 100 may also reduce the overall efficiency of the cooling system. For example, oil may enter high side heat exchanger 105 with the refrigerant, and cause high side heat exchanger 105 to remove heat from the refrigerant less efficiently.

Oil separator 140 may remove oil from the refrigerant of system 100. In certain embodiments, removing oil from the flow of refrigerant in system 100 prevents reductions in efficiency of the system. For example, removing oil from the refrigerant may prevent oil from entering high side heat exchanger 105 with the refrigerant, which may cause high side heat exchanger 105 to remove heat from the refrigerant less efficiently. Oil separator 140 may be of any suitable size, shape and capacity to remove oil from the flow of refrigerant.

As shown in FIG. 1, the discharge of low temperature compressor 135 is fed to medium temperature compressor 130. Medium temperature compressor 130 then compresses the refrigerant from medium temperature load 115 and low temperature compressor 135. Refrigerant from medium compressor 130 is fed to oil separator 140. Over time, oil separator 140 requires maintenance to continue to efficiently and effectively remove oil from the refrigerant of system 100. The flow of refrigerant in system 100 may be turned off during maintenance. For example, in conventional cooling systems, an oil separator may require a change of a core oil filter. A change of the core oil filter may require system 100 to be turned off. A change of the core oil filter may also require space around the filter in order to maneuver. The present disclosure may overcome this and other disadvantages by removing oil from the refrigerant without the need to change the core oil filter.

FIG. 2 illustrates an example horizontal oil separator 140. As shown in FIG. 2, horizontal oil separator 140 includes a first side 241, a second side 242, a third side 243, a fourth side 244, an inlet 250, a centrifugal chamber 260, a cutline 265, a filter 270, a second filter 280, a collector 290 and an outlet 255. Horizontal oil separator 140 may remove oil from the flow of refrigerant. Horizontal oil separator 140 may be of any suitable size, shape or capacity to remove oil from the flow of refrigerant.

Centrifugal chamber 260 may receive the refrigerant from compressor 130 and rotate the refrigerant. Rotating the refrigerant may separate an oil from the refrigerant. Centrifugal chamber 260 may rotate the refrigerant in one or multiple directions, including clockwise, counterclockwise, and/or a combination of the two. Centrifugal chamber 260 may rotate the refrigerant at any speed suitable to separate oil from the refrigerant. Centrifugal chamber 260 may be of any size, shape or capacity suitable to separate the oil from the refrigerant upon rotation. Centrifugal chamber 260 may separate an oil from the refrigerant regardless of changes in refrigerant flow rate. For example, by rotating the refrigerant, centrifugal chamber may cause oil to separate from the refrigerant even when refrigerant flow rates through system 200 are low.

In this way, centrifugal chamber 260 separates oil from the refrigerant. As discussed above, separating oil from the refrigerant may improve the efficiency of the cooling system. Centrifugal chamber 260 may separate oil from the refrigerant without the need to change a core oil filter. Therefore, centrifugal chamber 260 may allow for oil separator 140 to be sealed and be smaller in size than conventional oil separators. This also allows for oil separator 140 to require less maintenance. Thus, centrifugal chamber 260 does not require cooling system 200 to be turned off periodically.

Cutline 265 may prevent the oil separated in centrifugal chamber 260 from combining with the refrigerant. Conventional oil separators may rely on gravity to prevent the separated oil from recombining with the refrigerant. Cutline 265 prevents the separated oil from recombining with the refrigerant without the need to maintain a vertical orientation of the oil separator. Thus, cutline 265 may allow a horizontal orientation of oil separator 140. In some embodiments, a horizontal orientation allows oil separator 140 to be smaller in size than conventional oil separators. Cutline 265 may include any material suitable for preventing the oil separated in centrifugal chamber 260 from re-combining with the refrigerant. Cutline 265 may traverse at least a portion or the entire body of horizontal oil separator 140. Cutline 265 may run orthogonal to second side 242 and fourth side 244, parallel to first side 241 and second side 243, or at any angle suitable to first side 241, second side 242, third side 243, and/or fourth side 244 to prevent oil separated in centrifugal chamber 260 from re-combining with the refrigerant.

Filter 270 may separate additional oil from the refrigerant. Filter 270 includes any material suitable to separate additional oil from the refrigerant. For example, in some embodiments, filter 270 includes a plate 275. Plate 275 may separate additional oil from the refrigerant by reducing the speed of the oil upon impact. As a result, plate 275 causes the oil to precipitate downward from the refrigerant. Plate 275 may be made of any material suitable to reduce the speed of the oil and separate it from the refrigerant, such as any metal, steel, or composite. Filter 270 may separate oil from the refrigerant without the need to change a core oil filter. Therefore, filter 270 may allow for oil separator 140 to be sealed and have a smaller size. This also allows for oil separator 140 to require less maintenance. Thus, filter 270 does not require system 200 to be turned off periodically.

In certain embodiments, filter 270 is positioned between centrifugal chamber 260 and a second filter 280. In yet other embodiments, horizontal oil separator 140 includes second filter 280. Second filter 280 may be positioned proximate to plate 275 and outlet 255. Second filter 280 may be made of any material suitable to separate additional oil from the refrigerant. For example, second filter 280 may include mesh 285. Mesh 285 may separate additional oil from the refrigerant by filtering the oil from the refrigerant.

Collector 290 may collect the oil separated in centrifugal chamber 260 and the additional oil separated by filter 270. Collector 290 may also collect the additional oil separated by second filter 280. Collector 290 may be of any size, shape, or capacity suitable to collect the oil separated by centrifugal chamber 260, filter 270, and/or second filter 280. As illustrated in FIG. 2, collector 290 may be positioned proximate to third side 243 of horizontal oil separator 140. Collector 290 may be positioned beneath outlet 255 in certain embodiments. Collector 290 may be positioned at the bottom of horizontal oil separator 140. In some embodiments, collector 290 is coupled to second side 242 of horizontal oil separator 140. Oil may be removed from collector 290 and added back to low temperature compressor 135 and/or medium temperature compressor 130. Oil may be removed from collector 290 and added back to compressors may by an automatic or manual process.

Outlet 255 may discharge the refrigerant from horizontal oil separator 140 to high side heat exchanger 105. Outlet 255 may be positioned at the opposite end of horizontal oil separator 140 from inlet 250. As illustrated in FIG. 2, outlet 255 may be positioned proximate to second filter 280. Outlet 255 may be positioned above collector 290. Outlet 255 may be of any suitable size, shape, or capacity to discharge the refrigerant from horizontal oil separator 140 to high side heat exchanger 105.

In some embodiments, horizontal oil separator 140 includes inlet 250. Inlet 250 may receive the refrigerant from a compressor. For example, inlet 250 may receive the refrigerant from medium temperature compressor 130. Inlet 250 may be positioned proximate to centrifugal chamber 260. Inlet 250 may be positioned at least partially above, at least partially beneath, and/or level to centrifugal chamber 260. Inlet 250 may be positioned in any position proximate to centrifugal chamber 260 suitable for centrifugal chamber 260 to rotate the refrigerant received by inlet 250. Inlet 250 may receive the refrigerant from a compressor and direct the refrigerant to centrifugal chamber 260. Inlet 250 may be of any size, shape, or capacity suitable to receive the refrigerant from a compressor. As illustrated in FIG. 2, inlet 250 may be positioned at the opposite end of horizontal oil separator 140 from outlet 255. In some embodiments, inlet 250 may be coupled to first side 241.

Horizontal oil separator 140 may include a horizontal body including first side 241, second side 242, third side 243, and/or fourth side 244. In some embodiments, inlet 250 is coupled to first side 241. Collector 290 may be coupled to second side 242. Outlet 255 may be coupled to third side 243. In some embodiments, third side 243 is opposite first side 241. Fourth side 244 may be opposite second side 242 and coupled to third side 243 and first side 241, as illustrated in FIG. 2. Fourth side 244 may be parallel to cutline 265 and second side 242. Filter 270 may be coupled to fourth side 244 and second side 242. Second filter 280 may be coupled to fourth side 244 and second side 242.

This disclosure contemplates horizontal oil separator 200 including any number of components. For example, horizontal oil separator 140 may include any number of filters 270, second filters 280, plates 275, or meshes 285. As another example, horizontal oil separator 140 may include any number of centrifugal chambers 260 or cut lines 265. As another example, horizontal oil separator 140 may include any number of first side 241, second side 242, third side 243, and/or fourth side 243. As yet another example, horizontal oil separator 140 may include any number of collectors 290.

FIG. 3 is a flowchart illustrating a method 300 of operating the example cooling system 100 of FIG. 1 with horizontal oil separator 140 of FIG. 2. Various components of system 100 and oil separator 140 perform the steps of method 300. In certain embodiments, performing method 300 may improve the efficiency of a cooling system.

High side heat exchanger 105 may begin by removing heat from a refrigerant in step 305. In step 310, first load 120 may remove heat from a first space using the refrigerant. In step 315, first compressor 135 may compress the refrigerant from the first load 120. In step 320, centrifugal chamber 260 may receive the refrigerant from compressor 130 and/or 135. In step 325, centrifugal chamber 260 may rotate the refrigerant. In step 330, cutline 265 may prevent the oil separated in centrifugal chamber 260 from re-combining with the refrigerant. In step 335, filter 270 may separate additional oil from the refrigerant. In step 340, collector 290 may collect the separated oil in centrifugal chamber 260 and additional oil separated using filter 270. In step 350, outlet 255 may discharge the refrigerant to high side heat exchanger 105. Modifications, additions, or omissions may be made to method 300 depicted in FIG. 3. Method 300 may include more, fewer, or other steps. For example, steps may be performed in parallel or in any suitable order. While discussed as various components of cooling system 100 and horizontal oil separator 140 performing the steps, any suitable component or combination of components of system 100 and horizontal oil separator 140 may perform one or more steps of the method.

Although the present disclosure includes several embodiments, a myriad of changes, variations, alterations, transformations, and modifications may be suggested to one skilled in the art, and it is intended that the present disclosure encompass such changes, variations, alterations, transformations, and modifications as fall within the scope of the appended claims.

What is claimed is:

1. A system comprising:
a high side heat exchanger configured to remove heat from a refrigerant;
a load configured to use the refrigerant to remove heat from a first space proximate to the load;
a compressor configured to compress the refrigerant from the load;
a horizontal oil separator comprising:
   a horizontal body comprising a first side, a second side, a third side, a fourth side, and a fifth side;
   an inlet configured to receive the refrigerant from the compressor, wherein the inlet is coupled to the fifth side;
   a centrifugal chamber configured to:
      receive the refrigerant from the compressor; and
      rotate the refrigerant, wherein rotating the refrigerant separates an oil from the refrigerant;
   a metal plate coupled to the second side and the fourth side, the metal plate configured to separate additional oil from the refrigerant, the metal plate defining a plurality of apertures, the metal plate configured to allow the refrigerant to flow through the plurality of apertures, each aperture of the plurality of apertures having a diameter greater than a diameter of the inlet;
   a second filter comprising a mesh, wherein the second filter is coupled to the second side and the fourth side;
   a collector coupled to the second side and configured to collect the oil separated in the centrifugal chamber and the additional oil; and
   an outlet coupled to the third side and configured to discharge the refrigerant to the high side heat exchanger.

2. The system of claim 1, wherein the filter is between the centrifugal chamber and the second filter.

3. A method comprising:
removing heat from a refrigerant using a high side heat exchanger;
removing heat from a first space proximate to a load using the refrigerant;
compressing the refrigerant from the first load using a compressor;
receiving the refrigerant from the compressor using a horizontal oil separator comprising: a centrifugal chamber; and
a horizontal body comprising a first side, a second side, a third side, a fourth side, and a fifth side, wherein:
an inlet is coupled to the fifth side;
a collector is coupled to the second side;
a metal plate is coupled to the second side and the fourth side, the metal plate defining a plurality of apertures, the metal plate configured to allow the refrigerant to flow through the plurality of apertures, each aperture of the plurality of apertures having a diameter greater than a diameter of the inlet;
a second filter comprising a mesh is coupled to the second side and the fourth side;
an outlet is coupled to the third side; and
rotating the refrigerant using the centrifugal chamber, wherein rotating the refrigerant separates an oil from the refrigerant;
separating additional oil from the refrigerant using the metal plate;
separating additional oil from the refrigerant using the second filter;
collecting the oil separated in the centrifugal chamber and the additional oil using the collector;
discharging the refrigerant to the high side heat exchanger using the outlet.

4. The method of claim 3, wherein the filter is between the centrifugal chamber and the second filter.

5. A horizontal oil separator comprising:
a horizontal body comprising a first side, a second side, third side, a fourth side, and fifth side;
an inlet configured to receive refrigerant from a compress wherein the inlet is coupled to the fifth side;
a centrifugal chamber configured to:
   receive the refrigerant from the inlet; and
   rotate the refrigerant, wherein rotating the refrigerant separates an oil from the refrigerant;
a metal plate coupled to the second side and the fourth side, the metal plate configured to separate additional oil from the refrigerant, the metal plate defining a plurality of apertures, the metal plate configured to allow the refrigerant to flow through the plurality of apertures, each aperture of the plurality of apertures having a diameter greater than a diameter of the inlet;

a second filter comprising a mesh, wherein the second filter is coupled to the second side and the fourth side;

a collector coupled to the second side configured to collect the oil separated in the centrifugal chamber and the additional oil;

an outlet coupled to the third side configured to discharge the refrigerant to the high side heat exchanger.

6. The horizontal oil separator of claim 5, wherein the filter is between the centrifugal chamber and the second filter.

* * * * *